United States Patent [19]

Huston

[11] Patent Number: 5,718,137
[45] Date of Patent: Feb. 17, 1998

[54] FORK LOCK COVER

[76] Inventor: Fred Michael Huston, 2841 Saturn St., Unit-L, Brea, Calif. 92621

[21] Appl. No.: 697,908

[22] Filed: Aug. 30, 1996

[51] Int. Cl.⁶ .................................................. F05B 17/18
[52] U.S. Cl. ....................................... 70/423; 70/455
[58] Field of Search ......................... 70/423–428, 455

[56]  References Cited

U.S. PATENT DOCUMENTS

| | | | |
|---|---|---|---|
| 1,062,594 | 5/1913 | Isidor | 70/455 |
| 2,213,814 | 8/1940 | Jacobi | 70/455 |
| 2,355,300 | 8/1944 | Johnstone | 70/455 |
| 2,491,337 | 12/1949 | Segal | 70/455 |
| 2,931,209 | 4/1960 | Dies et al. | 70/455 |
| 4,597,274 | 7/1986 | Coscia et al. | 70/455 |
| 4,799,565 | 1/1989 | Handa et al. | 70/455 X |
| 4,881,391 | 11/1989 | Villa et al. | 70/455 |

FOREIGN PATENT DOCUMENTS

| | | | |
|---|---|---|---|
| 93771 | 7/1923 | Austria | 70/455 |
| 588109 | 12/1959 | Canada | 70/455 |
| 588032 | 4/1925 | France | 70/455 |
| 3544749 | 6/1987 | Germany | 70/455 |
| 226025 | 4/1969 | Sweden | 70/455 |

*Primary Examiner*—Lloyd A. Gall
*Attorney, Agent, or Firm*—John J. Connors; Connors & Assoc.

[57]  ABSTRACT

A motorcycle having a fork lock includes a cover which is adapted to be manually moved between a cover position where the cover overlies the fork lock and an uncovered position where the fork lock is exposed to allow a key to be inserted into the fork lock. The cover has a pivot member pivotally connecting the cover to the motorcycle to enable the cover to be rotated with respect to the fork lock to expose the fork lock so that the key may be inserted into the fork lock. A detent member maintains the relative position of the cover to the motorcycle so that the cover overlies the fork lock to cover the fork lock until a turning force is applied to the cover to move the cover between the cover position and the uncovered position.

9 Claims, 5 Drawing Sheets

FORK LOCK COVER

BACKGROUND OF THE INVENTION

1. Field of the Invention

This invention relates to a fork lock cover for a motorcycle that includes a detent member that maintains the cover in a position overlying the fork lock until manually moved to uncover the fork lock to enable a key to be inserted into the lock.

2. Background Discussion

Many motorcycles have a fork lock which locks the fork of the motorcycle in a cocked position. These locks are conventional and have a recess into which a key is inserted. This recess, because it is uncovered, is exposed to the elements, and rain, ice, dirt or other debris can block this recess. It would be highly desirable to have a simple-to-install and use cover that would prevent rain, ice, dirt or other debris from entering the recess in the lock. Ideally, this cover should be simple to manufacture and install, and be durable and withstand weathering and corrosion.

SUMMARY OF THE INVENTION

This invention has several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its benefits, which include convenience of installation, low cost and precision manufacture, and durability.

The first feature of the cover for a fork lock of a motorcycle is a cover plate pivotally attached to a base plate secured to the fork of the motorcycle. The cover plate is adapted to be manually moved between a cover position where the cover overlies the fork lock and an uncovered position where the fork lock is exposed to allow a key to be inserted into the fork lock. In accordance with this invention, the cover plate slides across the surface of the fork lock when moving between the cover and uncovered positions. Preferably, the cover plate and the base plate each have a circular configuration and each have essentially the same diameters. The cover plate is solid and both the base and cover plates are chrome plated. The base plate has an opening, preferably centrally located, which provides access to the fork lock when the base plate is secured to the motorcycle.

The second feature is a pivot member pivotally connecting the cover plate to the base plate to enable the cover plate to be rotated with respect to the base plate to expose the opening so that a key may be inserted into the fork lock. The pivot member includes a spacer positioned between the cover plate and the base plate, and the spacer is coupled to the cover plate to rotate as the cover plate is rotated. The cover plate and base plate are coaxially aligned and the pivot member includes a fastener which passes through a hole in the base plate near the perimeter of the base plate. This fastener has a distal end which is secured to the cover plate near the perimeter of the cover plate. Preferably, there is an "O" ring seated around the hole in the base plate adjacent the pivot member, and another "O" ring seated between the cover plate and the base plate. The spacer and the cover plate each have a pair of aligned hemispherical indentations therein with a ball element seated in these aligned hemispherical indentations to couple the spacer to the base plate.

The third feature is at least one detent member disposed between the base plate and the spacer that maintains the relative position of the cover plate to the base plate so that the cover plate overlies the base plate to cover said opening until a turning force is applied to the cover plate. Preferably, there are three detent members each spaced at 90 degrees with respect to each other. Each detent member includes a spring element seated in a bore in the base plate and a ball resting on the spring and partially seated in a hemispherical recess in the spacer when the recesses are aligned with the balls. The spacer has four hemispherical recesses, each recess spaced at 90 degrees with respect to each other. Thus, as the cover plate is rotated with respect to the base plate, each ball of each detent member is forced into its respective bore to compress the spring in its respective bore and roll across the surface of the spacer between the hemispherical recess, with the balls being forced into a recess by the springs when the recesses are aligned with the balls.

DESCRIPTION OF THE DRAWING

The preferred embodiment of this invention, illustrating all its features, will now be discussed in detail. This embodiment depicts the novel and non-obvious fork lock cover of this invention as shown in the accompanying drawing, which is for illustrative purposes only. This drawing includes the following figures (FIGS.), with like numerals indicating like parts.

DESCRIPTION OF THE PREFERRED EMBODIMENT

Figure 1:
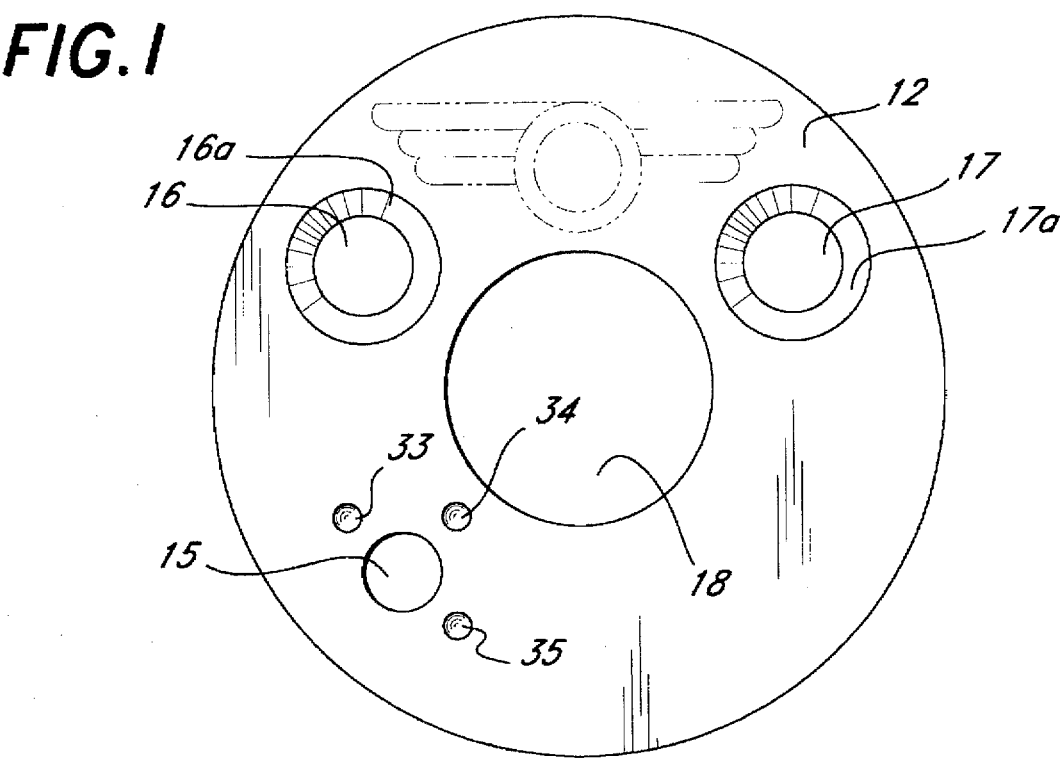
FIG. 1 is a plan view of the top surface of the base plate for the fork lock cover of this invention.
Figure 2:
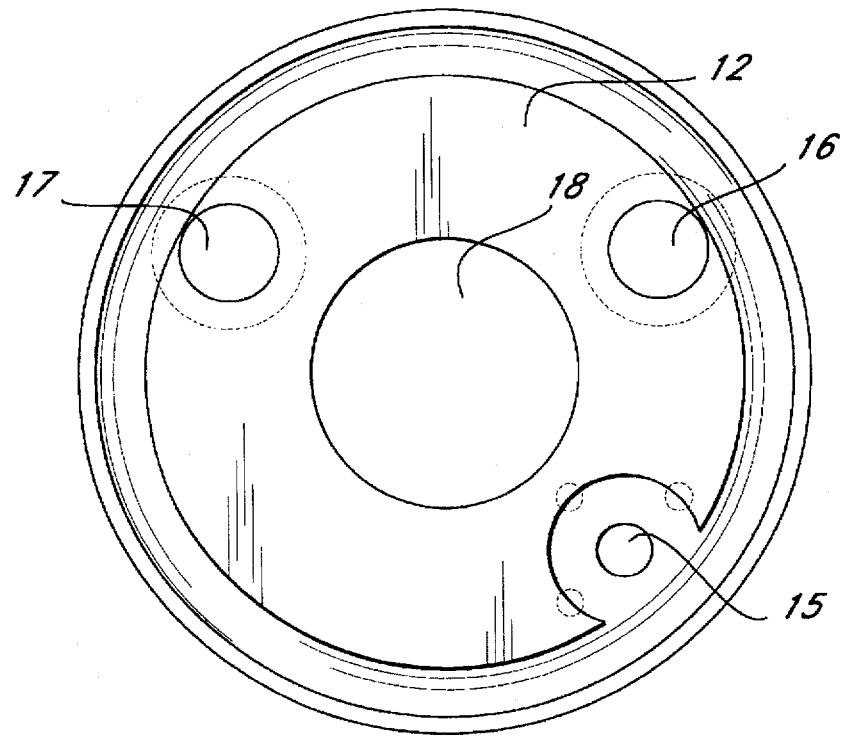
FIG. 2 is a plan view of the underside of the base plate shown in FIG. 1.
Figure 3:
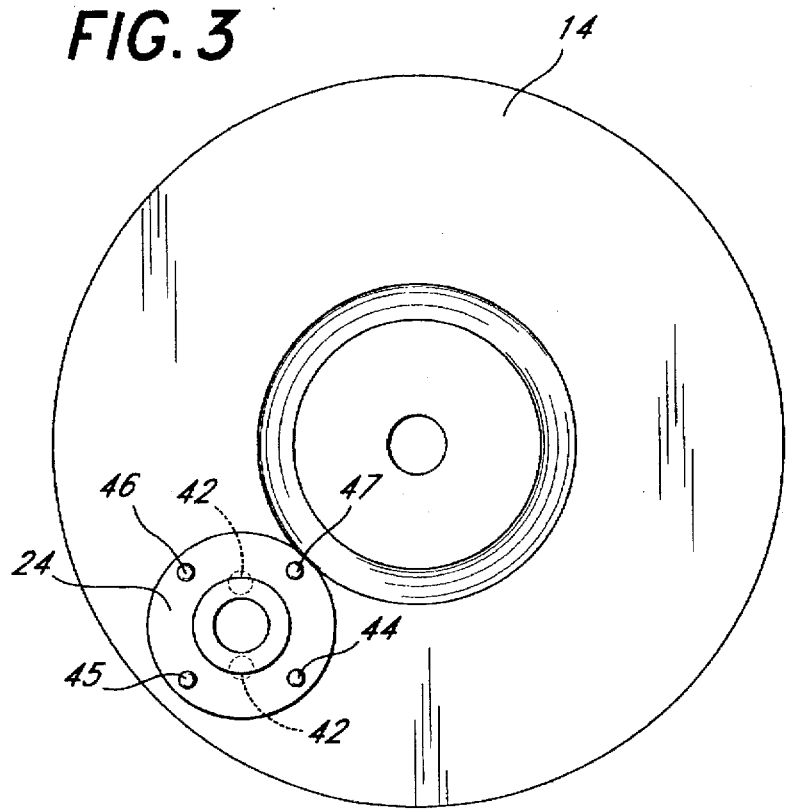
FIG. 3 is a plan view of the underside of the cover plate for the fork lock cover of this invention, showing a spacer element at a position near the perimeter of the cover plate.

As best illustrated in FIGS. 4, 5A, 5B, 6, and 7, the fork lock cover 10 of this invention includes a base plate 12 and a cover plate 14. As shown in FIGS. 1, 2 and 3, the base plate 12 has a circular configuration with a diameter approximately equal that of the cover plate 14, which also has a circular configuration. Typically, the diameters of the base plate 12 and cover plate 14 ranges from 1½ to 2 inches. The center of the base plate 12 and cover plate 14 are aligned upon assembly of the base plate and cover plate. In the base plate 12, there are three peripheral holes 15, 16, and 17 and an enlarged central opening 18. The holes 16 and 17 each have a tapered entryway 16a and 17a, respectively. Screws 57 pass through these holes 16 and 17 in a fork lock cover 20 to secure the base plate 12 to a fork lock 23 of the motorcycle 20a, with the heads 57a of these screws being seated in the tapered entryways 16a and 17a so these heads are flush with the base plate. When the cover 10 is secured to the fork lock 23, the enlarged central opening 18 overlies the recess 22 (FIG. 7) into which a key for the fork lock 23 is inserted.

The cover plate 14 has on its underside an annular groove 25 which is concentric with the center of the base plate 12 upon assembly of the base and cover plates. An O-ring 29 is seated in an annular groove 25 which is concentric with the center of the cover plate 14. A counterbore 15a in the peripheral hole 15 of the base plate 12 allows a screw 30 to be screwed into a threaded bore 32 in the underside of the cover plate, after first passing through the hole 15 in the base plate 12. The head 30a of the screw 30 is seated in the counterbore 15a as shown in FIG. 5B. There are three bores 33, 34, and 35 positioned about the hole 15. Each bore 33, 34, and 35 is offset 90 degrees with respect to an adjacent bore.

Figure 4:
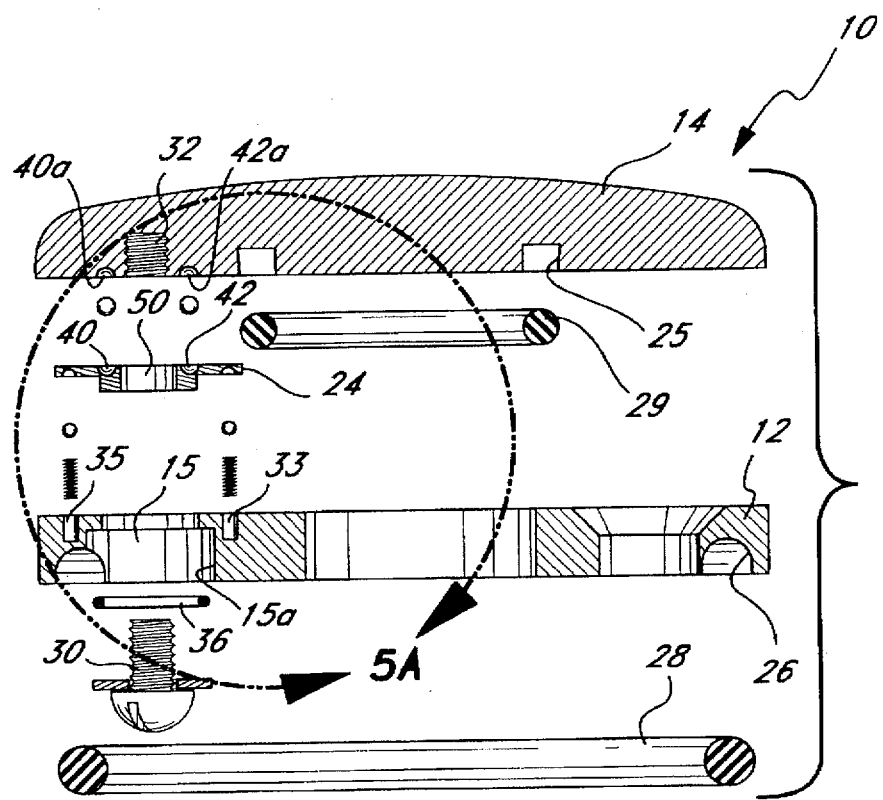
FIG. 4 is an exploded, cross-sectional view of the cover plate and base plate aligned and ready to be assembled.
Figure 5A:
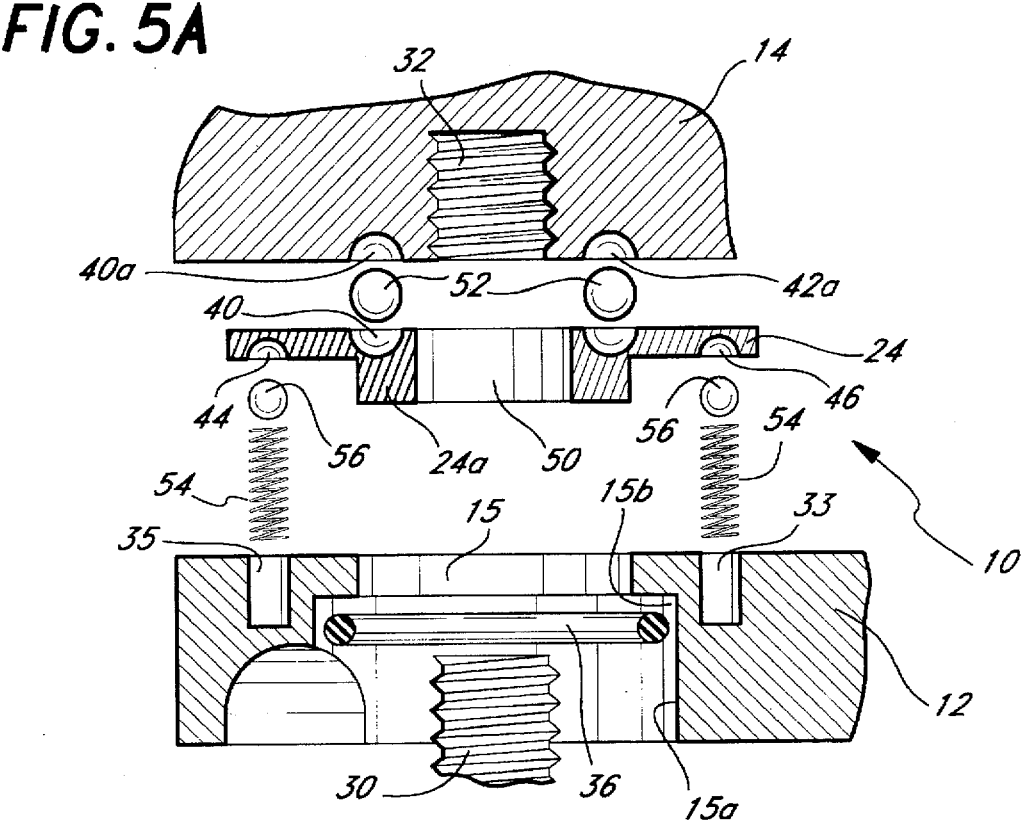
FIG. 5A is an enlarged, fragmentary view in cross-section taken along line FIG. 5A of FIG. 4.
Figure 5B:
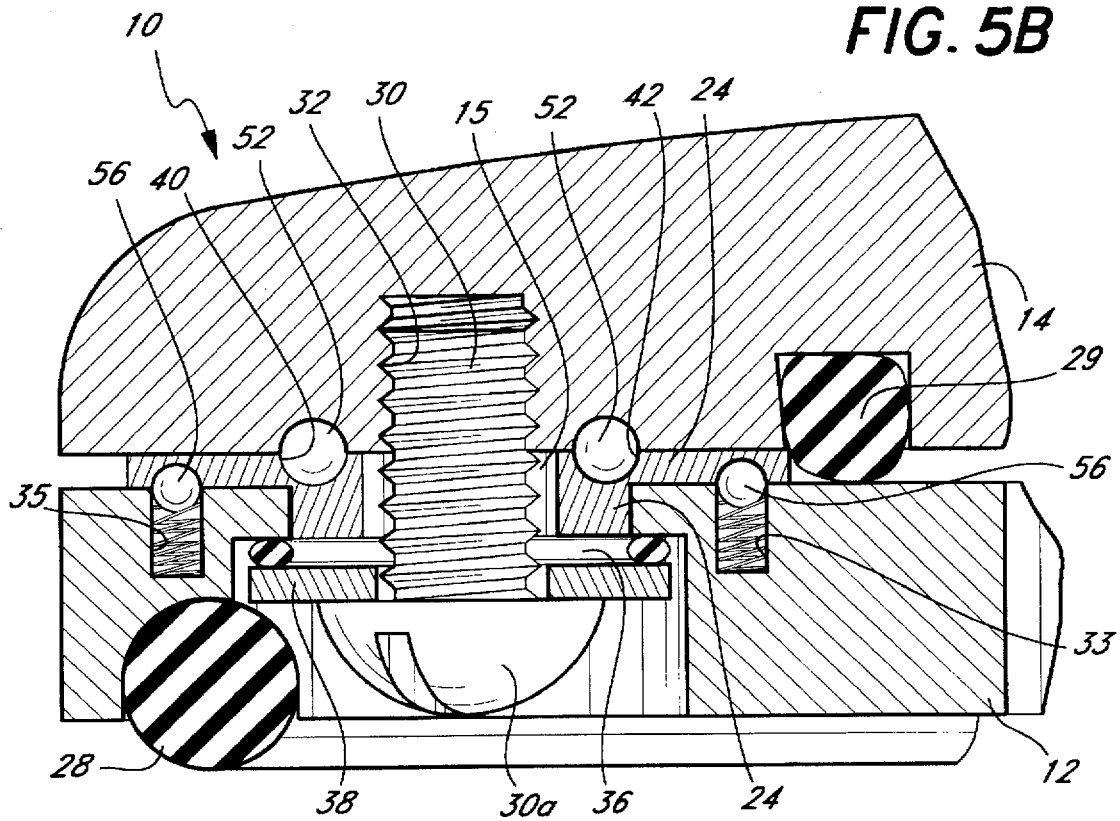
FIG. 5B is an assembly view in cross-section of the components shown in FIG. 5A.
Figure 6:
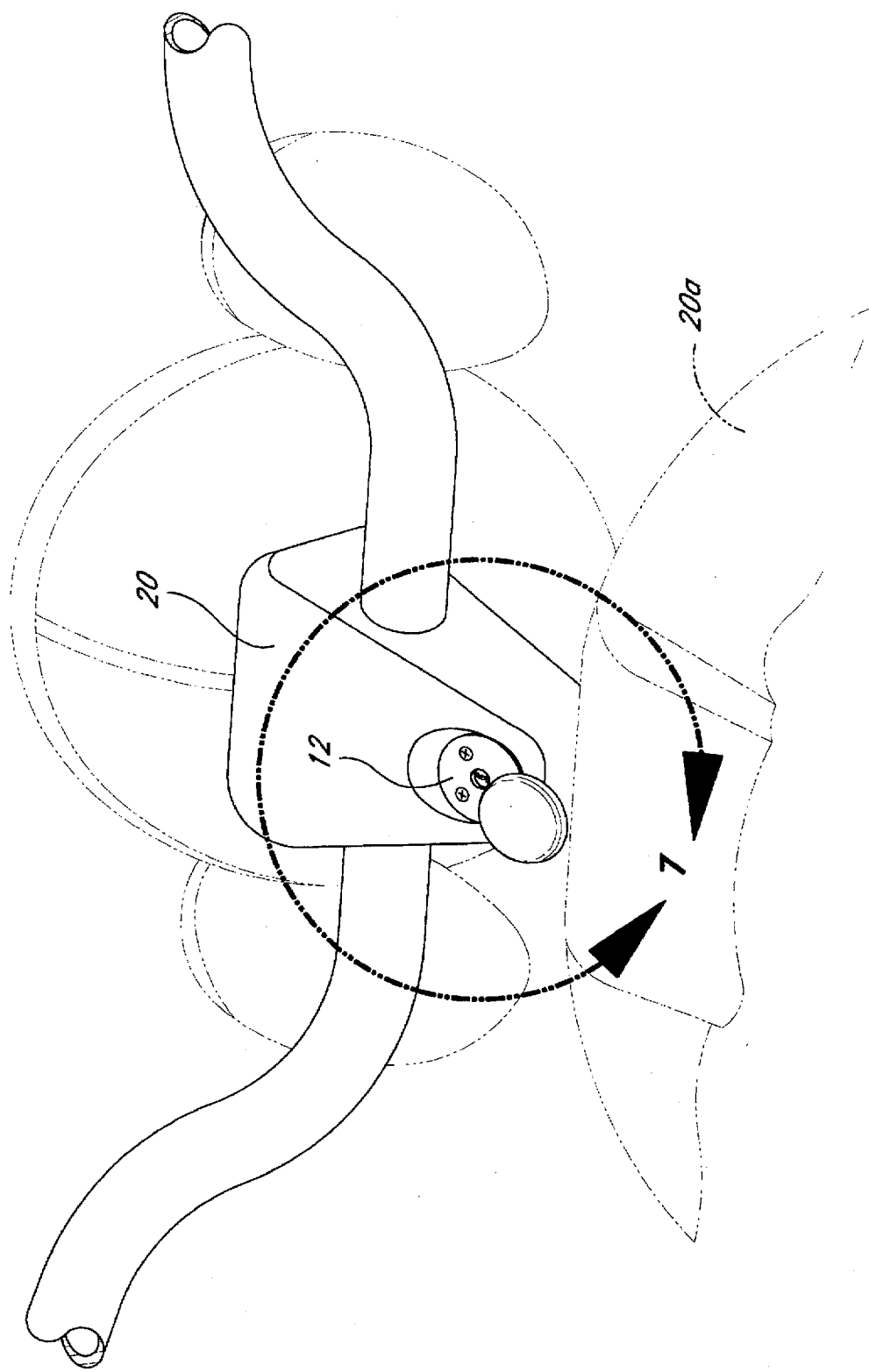
FIG. 6 is a perspective view of a motorcycle equipped with the fork lock cover of this invention.

As best illustrated in FIGS. 4, 5A, and 5B, the screw 30 passes through the hole 15 and a passageway 50 in a spacer member 24 to connect the base plate 12 to the cover plate 14 with the spacer member disposed between the cover and base plates. This spacer member 24 has a generally circular configuration, with the side of the spacer member 24 facing the base plate 12 having an angular rim 24a which fits into the opening 15 in the base plate 12. There is a land 15b in the opening 15 on which rests an O-ring 36 that is lodged between the rim 24a and a washer 38 seated on the head 30a of the screw 30. The side of the spacer member 24 facing the underside of the cover plate 14 includes a pair of aligned, hemispherical indentations 40 and 42. Opposite these hemispherical indentations 40 and 42 on the underside of the cover plate 14 are a pair of hemispherical indentations 40a and 42a. The side of the spacer member 24 adjacent the underside of the base plate 12 has four hemispherical indentations 44, 45, 46 and 47 located around the passageway 50 in the spacer member 24. Upon assembly of the cover and base plates, balls 52 are seated in each of the pairs of hemispherical indentations 40, 40a and 42, 42a to couple the spacer member 24 to the cover plate 14, so that with the rotation of the cover plate 14, the spacer member rotates about the screw 30. Seated in the bores 33, 34 and 35 in the base plate 12 are springs 54 with balls 56 resting on top of these springs. The four hemispherical recesses indentations 44, 45, 46 and 47 are at 90 degrees with respect to each other, and are aligned with at least three of the balls 56 at four different positions. The balls 56, resting on the springs 54 in the bores 33, 34 and 35 serve as detent members which maintain the relative position of the cover plate 14 to the base plate 12, until a turning force is applied to the cover plate. When a turning force is applied to the cover plate 14, it slides across the inside surface of the base plate 12 to expose the central opening 18. There are four different positions established by the detent members. Two of these partially cover the opening 18. One of these totally exposes this opening 18 to allow a key to access the recess 22. In another position the cover plate 14 completely covers the opening 18 and the center of the cover plate is aligned with the center of the base plate 12.

One of the advantages of this invention is that it is easy to assemble. The springs 54 are placed in the bores 33, 34 and 35, and the balls 56 are placed on top of the springs. The spacer member 24 is then placed in position with the rim 24a seated in the smaller diameter portion of the hole 15. The washer 38 is placed on the screw 30 so that it rests against the head 30a of the screw, and then the O-ring 36 is placed in position. With the balls 52 located in the hemispherical indentations 40 and 42 in the spacer member 24, the cover plate 14 is then screwed onto the base plate 12 with the O-ring 29 seated inside the angular groove 25. This assembly of base plate 12 and cover plate 14 can now be easily attached to the fork lock 23 of the motorcycle 20a. The cover plate 14 is manually rotated clockwise as viewed in FIG. 7 to expose the two holes 16 and 17 in the base plate 12 to enable the screws 57 to be screwed into the threaded receptacles commonly found in the fork lock 23 of the motorcycle 20a. Before attaching the base plate 12 to the fork lock 23, the O-ring 28 is seated in the groove 26 in the underside of the base plate 12.

Figure 7:
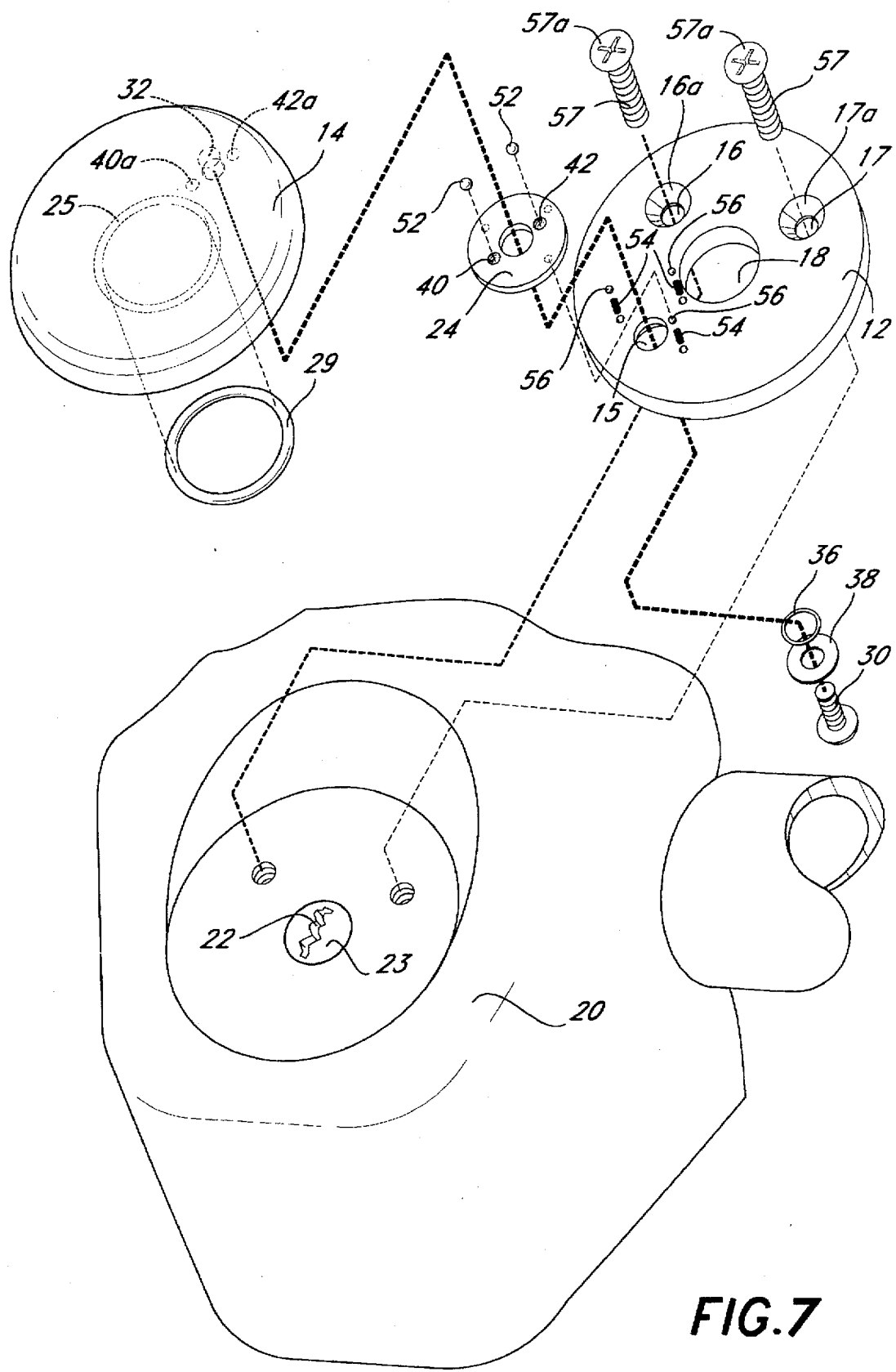
FIG. 7 is an exploded view of the fork lock cover of this invention mounted to the motorcycle's fork to cover the recess to the fork lock.

After attaching the cover 10 of this invention to the fork lock 23 of the motorcycle 20a, the cover is maintained in a position where it totally covers the central opening 18 in the base plate 12 until the motorcyclist manually pushes the cover plate 14 180° clockwise as viewed in FIG. 7 to a position where the central opening is totally exposed to allow access to the key recess 22. The cover plate 14 slides across the surface of the base plate 12 as it moves between a cover position and an uncovered position. After locking the fork lock 23, the cover plate 14 is returned by sliding it across the surface of the base plate 12 to cover the base plate 12 and the central opening 18 after withdrawal of the key.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A cover for a fork lock of a motorcycle, including
    a cover plate,
    a base plate having an opening which provides access to the fork lock when the base plate is attached to the motorcycle,
    a pivot member pivotally connecting the cover plate to the base plate to enable the cover plate to be rotated with respect to the base plate to expose the opening so that a key may be inserted into the fork lock,
    said pivot member including a spacer positioned between the cover plate and the base plate, said spacer being coupled to the cover plate to rotate as said cover plate is rotated,
    the spacer and the cover plate having aligned hemispherical indentations therein with a ball element seated in said indentations to couple the spacer to the cover plate, and
    a detent member disposed between the base plate and the spacer that maintains the relative position of the cover plate to the base plate so that the cover plate overlies the base plate to cover said opening until a turning force is applied to the cover plate.

2. The cover of claim 1 where the cover plate and the base plate each have a circular configuration and each have essentially the same diameter.

3. The cover of claim 2 where the cover plate and base plate are coaxially aligned and the pivot member includes a fastener which passes through a hole in the base plate near the perimeter of the base plate, said fastener having a distal end which is secured to the cover plate near the perimeter of the cover plate.

4. The cover of claim 3 where there is an "O" ring seated around the hole in the base plate adjacent the pivot member.

5. The cover of claim 1 where the opening is centrally located in the base plate.

6. The cover of claim 1 where there is an "O" ring seated between the cover plate and the base plate.

7. In a motorcycle having a fork lock, a cover attached to the motorcycle which is adapted to be manually moved between a cover position where the cover overlies the fork lock and an uncovered position where the fork lock is exposed to allow a key to be inserted into the fork lock, said cover being pivotally mounted to enable the cover to be rotated with respect to the fork lock to expose the fork lock so that said key may be inserted into the fork lock, and a detent member which maintains the relative position of the cover to the motorcycle so that the cover overlies the fork lock to cover said fork lock until a turning force is applied to the cover to move said cover between the cover position and the uncovered position, said detent member including a spacer, in the spacer and the cover aligned hemispherical indentations with a ball element seated in said indentations to couple the spacer to the cover.

8. A cover for a fork lock of a motorcycle, including a cover plate, a base plate having an opening which provides access to the fork lock when the base plate is attached to the motorcycle, a pivot member pivotally connecting the cover plate to the base plate to enable the cover plate to be rotated with respect to the base plate to expose the opening so that a key may be inserted into the fork lock, said pivot member including a fastener which passes through a hole in the base plate near the perimeter of the base plate, said fastener having a distal end which is secured to the cover plate near the perimeter of the cover plate, and a spacer positioned between the cover plate and the base plate, said spacer being coupled to the cover plate to rotate as said cover plate is rotated, said spacer and said cover plate each having a pair of aligned hemispherical indentations therein with a ball element seated in said aligned hemispherical indentations to couple the spacer to the cover plate, a plurality of detent members disposed between the base plate and the spacer that maintain the relative position of the cover plate to the base plate so that the cover plate overlies the base plate to cover said opening until a turning force is applied to the cover plate, each detent member including a spring element seated in a bore in the base plate and a ball resting on the spring element and partially seated in a hemispherical recess in the spacer when the recesses are aligned with the balls.

9. The cover of claim 8 where there are three detent members each spaced at 90 degrees and the spacer has four hemispherical recesses, each recess spaced at 90 degrees, so that as the cover plate is rotated with respect to the base plate, each ball of each detent member is forced into its respective bore to compress the spring element in its respective bore and roll across the spacer between the hemispherical recesses, with the balls being forced into a recess by the spring elements when the recesses are aligned with the balls.

* * * * *